United States Patent [19]
Broadhead et al.

[11] 3,928,067
[45] Dec. 23, 1975

[54] POLYALKYLENE GLYCOL ETHERS IN RECHARGEABLE LITHIUM NONAQUEOUS BATTERIES

[75] Inventors: John Broadhead, Morristown; Thomas Michael Putvinski, Scotch Plains; Forrest Allen Trumbore, Summit, all of N.J.

[73] Assignee: Bell Telephone Laboratories, Incorporated, Murray Hill, N.J.

[22] Filed: Sept. 6, 1974

[21] Appl. No.: 503,853

[52] U.S. Cl............................. 136/6 LN; 136/155
[51] Int. Cl.²........................................ H01M 10/00
[58] Field of Search........... 136/6 LN, 20, 154, 155, 136/100

[56] References Cited
UNITED STATES PATENTS

| | | | |
|---|---|---|---|
| 3,578,500 | 5/1971 | Marickle et al. | 136/6 LN |
| 3,594,235 | 7/1971 | Moran | 136/154 X |
| 3,642,436 | 2/1972 | Smith, Jr. | 136/6 LN X |
| 3,658,593 | 4/1972 | Caiola et al. | 136/6 LN |
| 3,686,038 | 8/1972 | Garth | 136/154 X |
| 3,778,310 | 12/1973 | Garth | 136/154 X |
| 3,796,604 | 3/1974 | Gabano et al. | 136/6 LN |
| 3,796,605 | 3/1974 | Dechenaux et al. | 136/6 LN |

Primary Examiner—John H. Mack
Assistant Examiner—C. F. Lefevour
Attorney, Agent, or Firm—W. G. Nilsen

[57] ABSTRACT

A lithium nonaqueous secondary battery is described which contains certain dopants to improve the recycling characteristics of the battery. Also, certain of these dopants act as wetting agents for the polypropylene separator. These batteries exhibit increased cycle life and increased cycle efficiency. Also, these batteries are more easily manufactured since vacuum filling to wet the separator is not necessary. These dopants include polyalkylene glycol ethers, tetraalkyl ammonium halides, and certain lithium salts.

6 Claims, 5 Drawing Figures

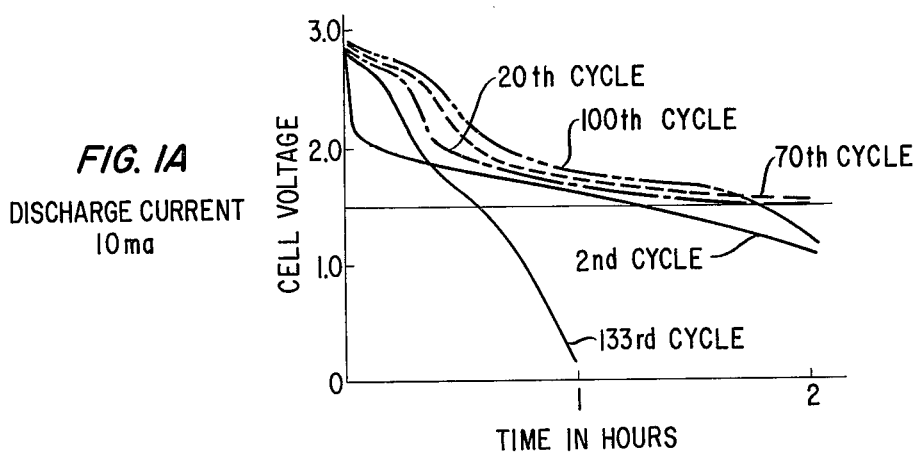
FIG. IA
DISCHARGE CURRENT
10 ma
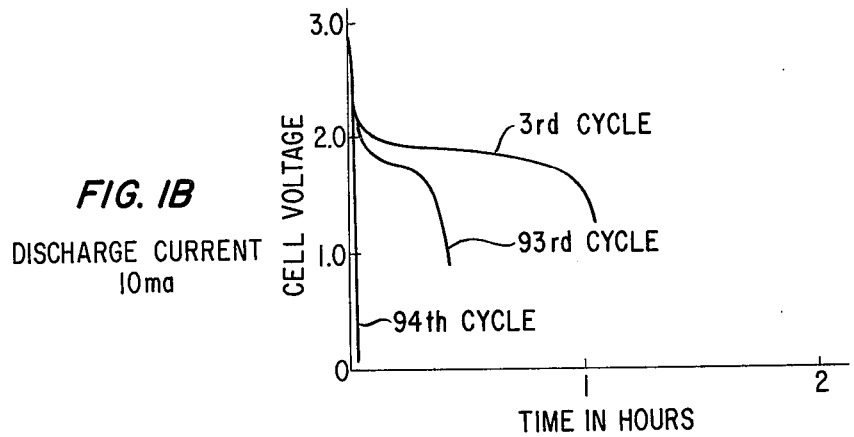
FIG. IB
DISCHARGE CURRENT
10 ma
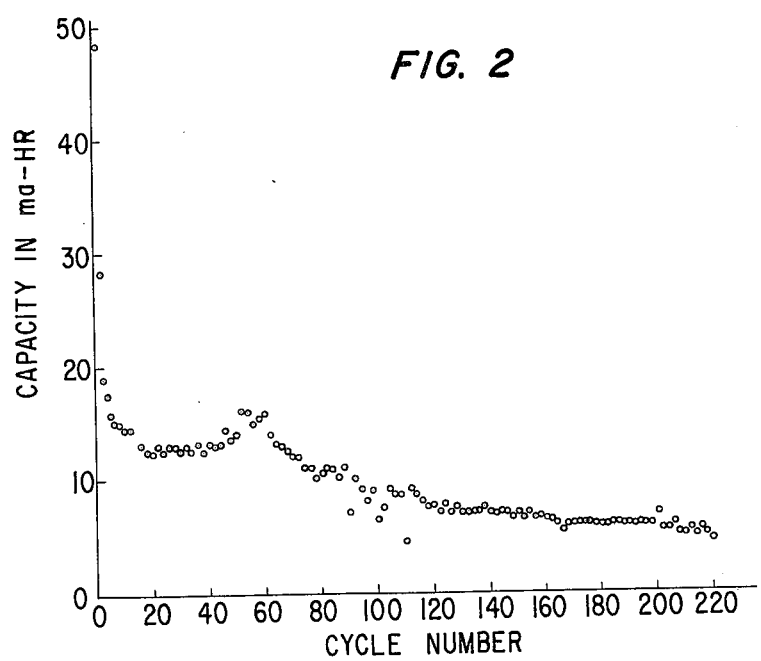
FIG. 2

POLYALKYLENE GLYCOL ETHERS IN RECHARGEABLE LITHIUM NONAQUEOUS BATTERIES

BACKGROUND OF THE INVENTION

1. Field of the Invention

The invention relates to lithium nonaqueous secondary batteries, and in particular, to lithium nonaqueous batteries containing certain dopants which increase recycleability and act as a wetting agent for the battery separator.

2. Description of the Prior Art

Lithium nonaqueous batteries have attracted considerable interest in recent years because of their potentially high voltage and high energy content per unit weight. These unusually attractive features result from the fact that water is not present to limit cell voltage. A particularly challenging problem associated with lithium nonaqueous batteries is improvement of their recycling characteristics. It would be desirable for many applications that both the efficiency and extent of recycleability be improved.

Another particularly difficult problem associated with lithium nonaqueous batteries is wetting of the microporous polymer separators to promote ionic conductivity through the separators. Separators may be wetted by vacuum filling the cell with electrolyte but this procedure is inconvenient in the commercial production of cells. Wetting agents may be used but these agents often are not compatible with the electrodes and electrolytes used in the nonaqueous cell. For example, where transition metal chalcogenides are used in the battery, the wetting agent should be compatible with these materials. (See, for example, "A New Lithium Nonaqueous Secondary Battery" by J. Broadhead, *Power Sources* 4, edited by D. H. Collins, Oriel Press, 1973. pp. 469-482).

Nonaqueous primary batteries using certain saturated ethers as components of a solvent system for nonaqueous electrolytes are described in U.S. Pat. No. 3,778,310 issued to B. H. Garth on Dec. 11, 1973.

SUMMARY OF THE INVENTION

The invention is a lithium nonaqueous secondary cell in which certain dopants are added in relatively small amounts to improve recycling characteristics. These dopants are certain polyalkylene glycol ethers, certain tetraalkylammonium halides, and certain lithium salts. The polyalkylene glycol ethers have the general formula $R(OR')_nOR''$, where R and R'' are methyl or ethyl groups, and R' is a $-CH_2-CH_2-$ group (ethylene group) and n varies from 2-6 with tetraglyme ($n=4$) preferred because of easy availability and extensive liquid range about room temperature. A concentration range of 1-5 weight percent is preferred because outside this concentration range recycling is less extensive. The halides in tetraalkyl ammonium halide are limited to chloride, bromide and iodide, and each alkyl group has up to 6 carbon atoms. Tetrabutylammonium chloride and tetrabutylammonium iodide are preferred because of low cost, easy availability and the extensive recycling obtained with these substances. The concentration range should preferably be between 0.01 and 0.6 molar. The lithium salt should have a concentration between 0.01 and 2.0 molar and be soluble and ionizable in the electrolyte solvent. The compounds LiI and LiClO$_4$ are preferred because of high solubility. A convenient way of adding the polyalkylene glycol ether and using it as a wetting agent for the separators is to wet the separators with the ether prior to assembly of the battery.

BRIEF DESCRIPTION OF THE DRAWING

FIG. 1 is a graph which presents data on the cycle performance of two lithium nonaqueous secondary batteries, one (A) made in accordance with the invention, and one (B) made without polyalkylene glycol ether and tetraalkyl ammonium halide;

FIG. 2 is a graph which presents data on the capacity as a function cycle number for a secondary cell made in accordance with the invention;

DETAILED DESCRIPTION

1. Preparation of the Cell

Figure 3:
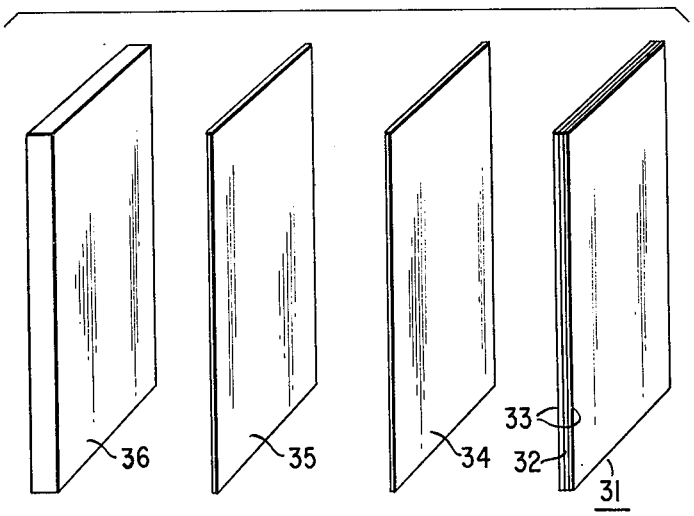
FIG. 3 shows the components of a thin film cell made in accordance with the invention.

In the practice of the invention both the positive electrode and the negative electrode may be of conventional design. For example, with the negative electrode in which the active material is lithium metal, the electrode may be in the form of a pressed pellet or may be rolled in the form of a sheet. Lithium metal is attractive as the active ingredient in the negative electrode because of high cell voltage and low density which leads to high capacity per unit weight.

Particularly attractive for battery application is a thin film lithium negative electrode. This electrode is made by rolling out lithium metal usually on a metallic inert substrate which also acts as the current collector. The advantage of thin film lithium electrodes is that they yield a larger surface area per unit weight of active material. This results in a greater fraction of the active material taking part in the charge/discharge cycle of the battery and also results in a higher power density for the electrode. Typical thicknesses of the lithium thin film electrode vary between 1 and 25 mils.

The positive electrode of the cell is also of conventional design. In particular, the designs described in U.S. Pat. No. 3,791,867 may be used. Also, positive electrodes in which the active material is niobium triselenide, tantalum trisulfide, titanium trisulfide, niobium trisulfide, or tantalum triselenide are compatible with the inventive cell.

In fabrication of these cells, care must be taken to exclude moisture from the active materials. Also, air must be excluded when highly reactive substances such as lithium are used in the cell.

The electrolyte used in the inventive cell consists of a solvent and a variety of dopants to be described below. The solvent must be compatible with the active ingredients in the positive and negative electrode, and should preferably have a large liquid range around room temperature. Suitable solvents are propylene carbonate, butyrolactone, ethylene carbonate, dimethylsulfite, acetonitrile, and dimethylsulfoxide. Propylene carbonate is preferred because of ready availability, large liquid range about room temperature (boiling point 242°C—melting point −48.8°C) and excellent solubility for certain lithium salts. Also incorporated in the electrolyte is 0.01-2.0 molar lithium salt where the upper concentration limit should not exceed the solubility of the salt in the electrolyte solvent. The compounds lithium iodide and lithium perchlorate, both alone and in combination, are preferred because of high solubility and ionization.

Many of the improved performance characteristics of the inventive cell are associated with the combination of critical amounts of certain polyalkylene glycol ethers and tetraalkylammonium halides. The increased recycleability of these cells depends on the use of limited amounts of polyalkylene glycol ethers with the general formulas $R(OR')_nR''$. Here, R and R'' are alkyl groups with up to two carbon atoms and R' is an ethylene group. It is preferred that $n$ be in the range between 2 and 6. Although the invention may be practiced with polyalkylene glycol ethers with $n$ outside this range, below $n=2$ the ether is inconveniently volatile and above $n=6$ the ether is difficult to obtain and usually excessively expensive. It is preferred that the ether is introduced into the cell as a wetting agent for the microporous polymer separator since this makes fabrication of this cell much easier and improves the performance of the cell. For example, when the ether is introduced into the cell as a wetting agent for the separator, vacuum filling of the cell is no longer necessary. Also, ion transport through the separator is facilitated by the use of a wetting agent for the separator.

A tetraalkylammonium halide is also incorporated into the solvent in making the electrolyte. The halide should be either chloride, bromide or iodide, and the alkyl group should be limited to 6 carbon atoms. The concentration of the tetraalkylammonium halide should preferably be in the range from 0.01–0.6 molar since this yields the greatest improvement in the recycling characteristics of the cell. The compounds tetrabutylammonium chloride and tetrabutylammonium iodide are preferred because of cost considerations and observed improvement in recycle performance. Assembly of the cell may be made with the actual active electrode ingredients described above or corresponding components of the discharged cell. In the latter case, the cell is charged to obtain active ingredients in the electrodes.

2. Characteristics of the Cell

The invention is best illustrated by a comparison of cells made in accordance with the invention and cells made without tetraalkylammonium iodide and without polyalkylene glycol ether. Such a comparison is shown in FIG. 1A and B. This figure shows a comparison of the discharge characteristics and recycle characteristics of a cell made in accordance with the invention and a cell without the tetraalkylammonium halide and ether. The cell used to obtain the data in FIG. 1A had a thin film lithium negative electrode and a niobium triselenide positive electrode and an electrolyte with propylene carbonate as solvent and the following dopants:

1.0 molar lithium perchlorate;
0.6 molar tetrabutylammonium iodide; and
2.0 weight percent tetraglyme.

The comparison cell used to obtain the data in FIG. 1B was the same as above except it did not contain tetrabutylammonium iodide or tetraglyme. As can be seen from the data shown in FIG. 1, the addition of small but significant amounts of tetraglyme and tetrabutylammonium iodide increased the recycleability of the cell and also increased the efficiency and extent that the cell could be recharged. Similar results were obtained where diglyme was used instead of tetraglyme. However, tetraglyme is less volatile than diglyme, which is advantageous in many applications.

FIG. 2 shows data on a similar cell where capacity is in units of milliamp-hours vs. cycle number. This cell had a thin film lithium electrode and a niobium triselenide positive electrode. The electrolyte was made up of propylene carbonate as solvent with 0.9 molar lithium perchlorate, 0.1 molar tetrabutylammonium chloride, and 3.0 weight percent tetraglyme. As can be seen from the data in FIG. 2, this cell exhibits extensive recycleability.

It is to be emphasized that relatively small amounts of polyalkylene glycol ether and tetraalkylammonium halide vastly improve the recycle performance of the nonaqueous cell. Although the mechanism responsible for this improvement is not completely understood, it is believed to be associated with improved morphology of the lithium metal at the lithium electrode after extended cycling. Specifically, scanning electron microscope studies were made of cells employing the inventive dopant and cells without these dopants. It was observed that in the inventive cells, the lithium metal remains smooth and compact over a large number of cycles whereas with cells not containing the above dopants the lithium tended to flake or became needle-like after a few cycles.

3. Structure of the Cell

FIG. 3 shows the cell components of a thin film battery including a positive electrode 31 composed of niobium metal 32 and thin films of niobium triselenide 33 which is the active component of the positive electrode. Also shown is the negative electrode 35 in which lithium is the active component. The lithium is in the form of a thin sheet which may or may not be attached to a metallic current collector. Typically, the metallic current collector may be nickel, niobium, zirconium, or other inert metallic substance. Also shown is the polypropylene separator 34. In the preferred embodiment of the invention, the polyalkylene glycol ether is introduced into the inventive cell by wetting the separator with this substance previous to the assembly of the battery. The thin film battery may be assembled in a variety of ways, including rolling the components in the form of a cylinder. This cylinder would usually have an outer hard material or can material 36. The remainder of electrolyte components are introduced by conventional means.

Figure 4:
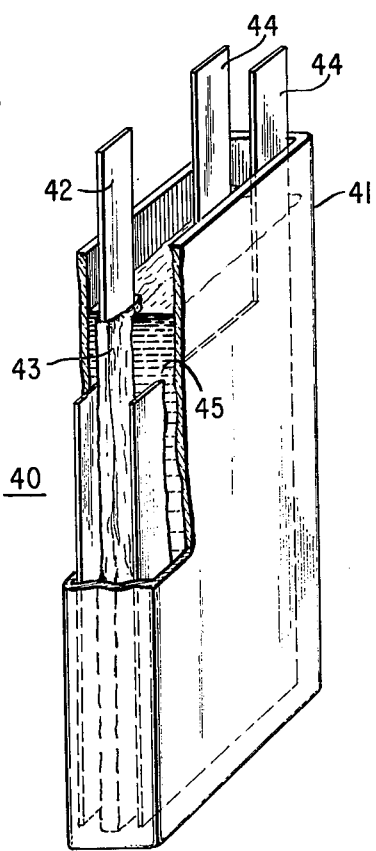
FIG. 4 shows a lithium nonaqueous secondary cell made in accordance with the invention.

FIG. 4 shows an alternate structure for the thin film battery 40 in which the individual components are contained in a rectangular container 41 made of inert material such as glass. The positive electrode 42 is composed of a niobium metal current collector with niobium triselenide as the active material. The positive electrode is surrounded by a microporous polypropylene separator 43 which is wetted with tetraglyme prior to introduction into the cell container. Also shown are lithium negative electrodes 44 which also may be surrounded by microporous polypropylene separator wetting with tetraglyme. The container also contains the electrolyte 45 composed of polypropylene carbonate, lithium salt, tetrabutylammonium chloride and tetraglyme. After assembly of the cell the container is sealed off to prevent introduction of moisture or air. Assembly of the cell should be carried out in the absence of moisture and air.

What is claimed is:

1. A nonaqueous secondary battery comprising a lithium negative electrode, a positive electrode, electrolyte and microporous polymer separators in which the electrolyte consists essentially of a solvent, 0.01–2.0 molar lithium salt, where the lithium salt is selected from the group consisting of LiI and LiClO$_4$, and other dopants characterized in that the other dopants are 1–5 weight percent of tetraglyme and 0.01–0.6 molar tetrabutylammonium iodide.

2. The nonaqueous secondary battery of claim 1 in which the solvent is selected from a group consisting of propylene carbonate, butyrolactone, ethylene carbonate, dimethylsulfite, acetonitrile and dimethylsulfoxide.

3. The nonaqueous secondary battery of claim 2 in which the solvent is propylene carbonate.

4. The nonaqueous secondary battery of claim 1 in which the lithium negative electrode is a thin film electrode with thickness between 1 and 25 mils.

5. The nonaqueous secondary battery of claim 1 in which the tetraglyme is used as a wetting agent for the microporous polypropylene separators.

6. The nonaqueous secondary battery of claim 1 in which the microporous polymer separators consists essentially of polypropylene.

* * * * *